United States Patent Office 3,032,394
Patented May 1, 1962

3,032,394
PROCESS FOR MANUFACTURE OF MAGNESIUM ALUMINO-SILICATE
Seizo Ishino, Toyama-shi, and Matajiro Osaka, Imizu-gun, Toyama, Japan, assignors to Fuji Kagaku Kogyo Kabushiki Kaisha, Toyama, Japan, a company of Japan
No Drawing. Filed Dec. 6, 1960, Ser. No. 73,998
8 Claims. (Cl. 23—110)

The present invention relates to the preparation of magnesium aluminosilicates and particularly to the preparation of such materials which are especially suitable for use as agents for the alleviation of conditions arising from hyperacidity in the stomach.

In our copending application, Serial No. 645,908, filed March 14, 1957, now U.S. Patent 2,970,889, we have described the manufacture of medicinal magnesium aluminosilicate by a process wherein sodium aluminosilicate is first formed in an aqueous medium and then magnesium is substituted for the sodium without isolating the intermediate sodium compound from the mother liquor.

In accordance with the present invention the magnesium aluminosilicate of application Serial No. 645,908 and two new products as will appear hereinafter are produced by a process wherein a basic magnesium aluminate is reacted with sodium silicate with the reaction again being conducted under hydrous conditions. By starting with either a monobasic or dibasic sodium aluminate and varying the proportions of the reactants, there can be produced any one of three magnesium aluminosilicates. Thus a magnesium aluminosilicate having the formula $$2MgO.Al_2O_3.SiO_2$$

hereinafter referred to as compound A, is prepared by reacting equi-molecular proportions of monobasic sodium aluminate and a water soluble compound furnishing magnesium ions, such as magnesium chloride, and reacting the magnesium aluminate thus produced, without separating and drying it, with sodium silicate in the proportion of two mols of magnesium aluminate for each mol of sodium silicate.

The chemical reactions involved are indicated by the following equations:

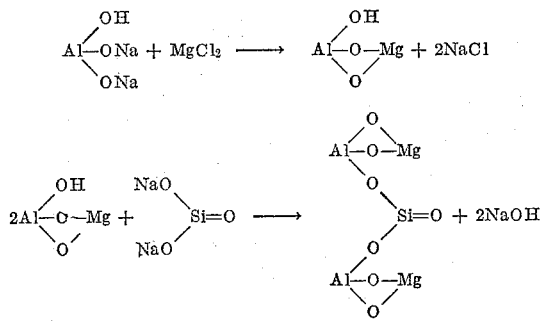

A magnesium aluminosilicate, hereinafter referred to as compound B, having the formula $MgO.Al_2O_3.2SiO_2$, that of the compound disclosed by copending application, Serial No. 645,908, is obtained by reacting dibasic sodium aluminate with a water-soluble magnesium compound furnishing magnesium ions in the proportion of two mols of the sodium aluminate for each mol of the magnesium compound and reacting the magnesium aluminate so formed, without separating and drying it, with sodium silicate in the proportion of two mols of sodium silicate for each mol of magnesium aluminate.

The chemical reactions involved are indicated by the following equations:

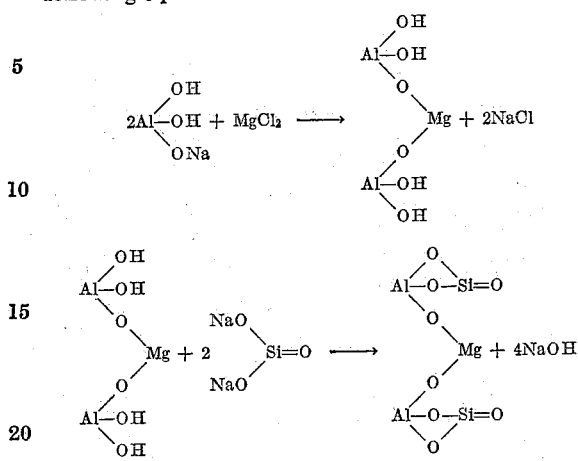

A magnesium aluminosilicate having the formula $MgO.Al_2O_3.SiO_2$, hereinafter referred to as compound C, is produced by reacting in equi-molecular proportion with sodium silicate, the same magnesium aluminate which is employed as an intermediate in the preparation of compound B.

The chemical reactions involved in the preparation of this magnesium aluminosilicate are illustrated by the following equations:

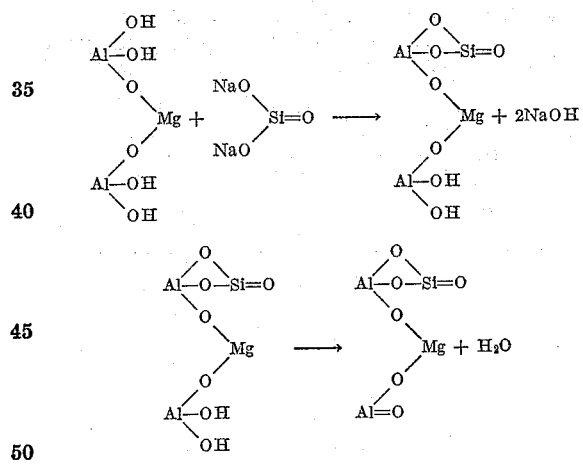

The monobasic and dibasic sodium aluminates employed in the reactions described above may be prepared by reacting in the proper proportions, aluminum sulfate and sodium hydroxide. The magnesium compound may be any such compound which disassociates in water to furnish magnesium ions. The sodium silicate used is one which in the dry state contains 37.2% of pure $SiO_2$.

The magnesium aluminosilicates obtained by the method of this invention are white and tasteless powders, insoluble in water, and soluble in warm aqueous hydrochloric acid to form clear solutions. Moreover, and this is extremely important in the intended medical usage of the products obtained by the methods described above, these products are in the amorphous rather than crystalline state and this is confirmed by observations using an electron microscope and by preparing X-ray powder diffraction patterns of each. These patterns are devoid of any sharp diffraction lines which indicate that the products are all truly amorphous in nature or at least may be classified as cryptocrystalline.

The products dried at 105–110° C. showed the following analyses in percent by weight:

|  | Compound A | Compound B | Compound C |
|---|---|---|---|
| $SiO_2$ | 18.32 | 36.41 | 23.02 |
| $Al_2O_3$ | 32.76 | 31.34 | 39.50 |
| MgO | 25.60 | 12.10 | 15.71 |
| Ignition loss | 23.67 | 21.39 | 21.79 |

The sodium content of the magnesium aluminosilicates is very small, i. e., it is no more than 0.094% in compound A, 0.57% in compound B and 0.134% in compound C.

Thus it will be seen that the analytical results confirm the formulas set forth in the above equations. The ignition losses indicate that when dried to constant weight at 105–110° C., compounds A and B contain four molecules of water and that compound C contains three molecules of water. This is believed to be bound water since when, after ignition at 850–900° C., a sample of each compound is soaked in water for a few hours, dried to constant weight at 105–110° C. and again ignited at 850–890° C., the weight loss is the same as it was in the first ignition. From this it will be seen that when prepared according to the methods outline above, compound A may be expressed by the formula $2MgO.Al_2O_3.SiO_2.4H_2O$, compound B by the formula $MgO.Al_2O_3.2SiO_2.4H_2O$ and compound C by the formula $MgO.Al_2O_3.SiO_2.3H_2O$.

A true picture of the value of the present compounds as antacid agents in medicine is afforded by their behavior when subjected to the Fuch's test which is described in "Drug and Cosmetic Indust." 64: 692, 1949. The Fuch's test measures the ability of an antacid to neutralize excess acidity in the stomach by reacting with the acid causing it as it is secreted over a period of time. All of the products of this invention have the ability when tested by the Fuch's procedure, using an amount of the compound being tested which is equivalent to a normal dosage unit of an antacid agent, to maintain the pH within the range of 3–5 for a period of time of at least 50 minutes.

The results of Fuch's antacidity tests using 0.6 gram of each of the magnesium aluminosilicates of this invention are shown in tabular form as follows:

| Compound | Time |  |  |  |  |  |  |  |  | Remarks |
|---|---|---|---|---|---|---|---|---|---|---|
|  | 1' | 3' | 5' | 10' | 20' | 30' | 40' | 50' | 60' |  |
| A | 3.7 | 3.7 | 3.7 | 3.8 | 3.6 | 3.5 | 3.3 | 3.2 | 2.7 | The numbers used are the pH values recorded. |
| B | 3.2 | 3.7 | 3.7 | 3.8 | 3.6 | 3.5 | 3.3 | 3.2 | 2.7 |  |
| C | 3.3 | 3.5 | 3.6 | 3.6 | 3.7 | 3.6 | 3.5 | 3.3 | 3.2 | 3.0 |

The magnesium almuinosilicates prepared according to this invention, while they may be economically produced, have good adsorption ability, excellent neutralizing ability and the ability to control the acidity of the stomach within proper limits over an extended period of time. Thus, they are very effective as medicinal antacid agents, and are well adapted to all distresses which arise from a condition of hyperacidity, and they do not cause constipation.

The following examples are set forth as illustrative of the invention:

*Example 1*

To 297 grams of industrial aluminum sulfate (containing 17.2 percent of alumina) dissolved in 900 cc. of water are added slowly with stirring 208 grams of caustic soda (96% NaOH) dissolved in 624 cc. of water to produce monobasic sodium aluminate. 208 grams of magnesium chloride (containing 46% of pure $MgCl_2$) dissolved in 624 cc. of water are then added with stirring to produce monobasic magnesium aluminate

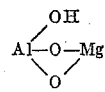

which is allowed to remain in the mother liquor. 80.5 grams of sodium silicate (containing 37.2% of $SiO_2$) dissolved in 250 cc. of water are added with vigorous stirring and the mixture is allowed to stand for about 4 hours. To remove the excess sodium sulfate and caustic soda and the sodium chloride formed in the reaction, a large quantity of water is added and decanted. The flaky precipitate is filtered and dried at 60° C., until its gel-like form is lost. The product is then dried at 105–110° C. and there is obtained 135 grams of a magnesium aluminosilicate having the formula $2MgO.Al_2O_3.SiO_2$.

*Example 2*

To 297 grams of industrial aluminum sulfate (containing 17.2 percent of alumina) dissolved in 900 cc. of water, there are added slowly with stirring 167 grams of 96% caustic soda dissolved in 500 cc. of water to produce dibasic sodium aluminate. 104 grams of magnesium chloride (containing 46% of pure $MgCl_2$) dissolved in 310 cc. of water are then added with stirring and dibasic magnesium aluminate

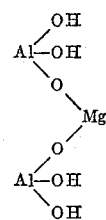

is produced. Without separating the magnesium aluminate from the mother liquor, 161 grams of sodium silicate (containing 37.2% of $SiO_2$) dissolved in 480 cc. of water are added with vigorous stirring and allowed to stand for about 4 hours. The precipitate is washed with a large quantity of water by decantation to remove the dissolved solids and filtered. The residue is dried at 60° C. and then further dried at 105–110° C. There is obtained 143 grams of $MgO.Al_2O_3.2SiO_2$.

*Example 3*

Dibasic magnesium aluminate is prepared by repeating the procedure of Example 2 and then there are added with vigorous stirring 80.5 grams of sodium silicate (containing 37.3% of $SiO_2$) dissolved in 250 cc. of water and allowed to stand for about 4 hours. The precipitate thus obtained is washed by decantation with a large quantity of water to remove the dissolved impurities and filtered. The residue is dried at 60° C. and then further dried at 105–110° C. There is obtained 126 grams of $MgO.Al_2O_3.SiO_2$.

We claim:

1. A process of preparing a magnesium aluminosilicate having the formula $2MgO.Al_2O_3.SiO_2$ comprising reacting in an aqueous medium to form monobasic magnesium aluminate, equimolecular proportions of monobasic sodium aluminate and a magnesium compound which furnishes magnesium ions in said medium; without drying said magnesium aluminate, reacting it in an aqueous medium with sodium silicate in the proportion of two mols of the magnesium aluminate for each mol of the sodium silicate; and separating the magnesium aluminosilicate so formed from the aqueous medium.

2. The process of claim 1 in which said magnesium aluminate is not separated from the mother liquor prior to reaction with said sodium silicate.

3. A process of preparing a magnesium aluminosilicate having the formula $MgO.Al_2O_3.2SiO_2$ comprising reacting in an aqueous medium to form dibasic magnesium aluminate, dibasic sodium aluminate with a magnesium compound forming magnesium ions in said medium, the reactants being in the proportion of two mols of said sodium aluminate for each mol of said magnesium compound; without drying said magnesium aluminate, reacting it in an aqueous medium with sodium silicate in the proportion of two mols of the sodium silicate for each mol of the magnesium aluminate; and separating the magnesium aluminosilicate so formed from the aqueous medium.

4. The process of claim 3 in which said magnesium aluminate is not separated from the mother liquor prior to reaction with said sodium silicate.

5. A process of preparing a magnesium aluminosilicate having the formula $MgO.Al_2O_3.SiO_2$ comprising reacting in an aqueous medium to form dibasic magnesium aluminate, dibasic sodium aluminate with a magnesium compound forming magnesium ions in said medium, the reactants being in the proportion of two mols of said sodium aluminate for each mol of said magnesium compound; without drying said magnesium aluminate, reacting it in equimolecular proportions in an aqueous medium with sodium silicate; and separating the magnesium aluminosilicate so formed from the aqueous medium.

6. The process of claim 5 in which said magnesium aluminate is not separated from the mother liquor prior to reaction with said sodium silicate.

7. As an antacid for medicinal purposes, an amorphous magnesium aluminosilicate having the formula
$$2MgO.Al_2O_3.SiO_2$$
said magnesium aluminosilicate being substantially free of sodium, insoluble in water but soluble in warm aqueous hydrocloric acid, said magnesium aluminosilicate having antacid properties that in the Fuch's test 0.6 gram will maintain the pH at a value within the range of from 3–5 for at least 50 minutes.

8. As an antacid for medicinal purposes, an amorphous magnesium aluminosilicate having the formula $MgO.Al_2O_3.SiO_2$, said magnesium aluminosilicate being substantially free of sodium, insoluble in water but soluble in warm aqueous hydrochloric acid, said magnesium aluminosilicate having antacid properties such that in the Fuch's test 0.6 gram will maintain the pH at a value within the range of from 3–5 for at least 50 minutes.

References Cited in the file of this patent

FOREIGN PATENTS

G8,505      Germany _____ Oct. 27, 1955